United States Patent [19]

Helling

[11] 4,426,438
[45] Jan. 17, 1984

[54] ANIONIC COPOLYMERS CONTAINING POLYVALENT METAL CATIONS AND THEIR USE IN PHOTOGRAPHIC MATERIALS

[75] Inventor: Günter Helling, Cologne, Fed. Rep. of Germany

[73] Assignee: Agfa-Gevaert Aktiengesellschaft, Leverkusen, Fed. Rep. of Germany

[21] Appl. No.: 225,382

[22] Filed: Jan. 15, 1981

[30] Foreign Application Priority Data

Jan. 23, 1980 [DE] Fed. Rep. of Germany ....... 3002287

[51] Int. Cl.³ .......................... G03C 1/40; G03C 5/54
[52] U.S. Cl. .................................. 430/213; 430/215; 430/627; 526/317; 525/196
[58] Field of Search ................. 430/213, 215, 17, 510, 430/518, 627; 526/317; 525/191, 196; 252/300

[56] References Cited

U.S. PATENT DOCUMENTS

| | | | |
|---|---|---|---|
| 3,338,739 | 8/1967 | Rees | 525/196 |
| 4,273,853 | 6/1981 | Ponticello et al. | 430/213 |
| 4,299,895 | 11/1981 | Archie et al. | 430/213 |

*Primary Examiner*—John E. Kittle
*Assistant Examiner*—John L. Goodrow
*Attorney, Agent, or Firm*—Connolly and Hutz

[57] ABSTRACT

Metal cation loaded cross-linked anionic polymer as described herein is useful in the preparation of an indicator sheet for complex forming organic compounds or in the preparation of dyed or dyable layers in photographic materials, particularly in an image receiving layer when the image dyes are complex-formers.

3 Claims, No Drawings

ANIONIC COPOLYMERS CONTAINING POLYVALENT METAL CATIONS AND THEIR USE IN PHOTOGRAPHIC MATERIALS

This invention relates to anionic copolymers containing polyvalent metal cations, which when used as aqueous dispersions (latices) are resistant to coagulation and sedimentation. It also relates to the use of the above mentioned copolymers in photographic recording materials, in particular in image receiving layers for the dye diffusion transfer process.

Many anionic polymer dispersions (latices) are known. Most of these dispersions contain only a small amount of the fixed negative charges required to stabilise them. To preserve the principle of electron neutrality, the fixed negative charges are normally compensated by univalent cations such as alkali metal cations. Replacement of the univalent cation by polyvalent cations generally leads to coagulation and hence breakdown of the latices. Attempts to prepare polymer dispersions which are resistant to the influences of polyvalent metal cations are known. In German Offenlegungsschrift No. 2,841,875, polymer latices which are prepared by the copolymerisation of glycidyl acrylates and acrylamides with acrylates, using large quantities of anionic wetting agents are described. Although the latices described have a higher compatability with polyvalent metal cations than pure polyacrylate latices, they are not stable towards large quantities of metal salts if the wetting agent content is less than 1.5%. Moreover, because of the absence of anionic groups, the latices described are not capable of binding large quantities of metal cations. This can be seen from the fact that mixtures of metal salts and polymer latices separate rapidly into their components when washed or dialysed.

The use of polyvalent metal cations, particularly those which are complex forming, are of special interest in image receiving layers for the photographic dye diffusion transfer process. The light-sensitive recording material used in the dye diffusion transfer process, which is particularly important for instant colour photography, comprises, as is well known, a plurality of silver halide emulsions layers differing in their spectral sensitivity, and colour providing compounds associated with these layers. Suitable colour providing compounds include, for example, the so-called dye developers which are originally diffusible compounds with a chromophoric group and which have a developer function by which the compounds are immobilised imagewise in the development process; non-diffusible color providing compounds having a chromophoric group which is released imagewise as a diffusible dye or dye precursor in the development process may also be used. If the chromophoric group of the dye developers of the non-diffusible color providing compounds contains special substituents which are suitable as ligands for complex formation with polyvalent metal cations, the complex formation can be utilised to improve the stability to light, to influence the colour tone and to fix the image dyes transferred to the image receiving layer. Complex formation is preferably carried out only after colour transfer has taken place, either by treating the image receiving material with a solution of the complex forming polyvalent metal cations, e.g. in the form of a solution of the corresponding salts, or by incorporating the polyvalent metal cations in one or more layers of the image receiving material so that, in the development process, they can react immediately with complex formation with the dyes which have diffused into the layers.

Polymers containing polyvalent metal cations bound by complex formation and their use in image receiving layers of colour photographic materials for th dye diffusion transfer process have been described in Research Disclosure No. 18534 (September 1979). The polymers mentioned there, however, have only a limited capacity to take up polyvalent metal cations and it would be desirable, by using polymers with an increased capacity for polyvalent metal cations, to provide the conditions for reducing the required minimum thickness of the layers.

The present invention relates to anionic copolymers corresponding to the following formula containing polyvalent metal cations:

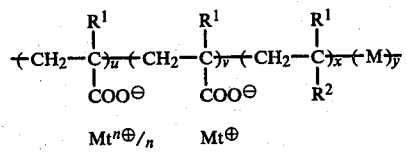

$$Mt^{n\oplus}/n \quad Mt^{\oplus}$$

in which $R^1$ represents hydrogen or a methyl or carboxymethyl group;

$R^2$ represents the residue of an organic cross-linking compound having at least one other copolymerisable or copolymerised C—C double bond;

M represents polymerised units of an ethylenically unsaturated monomer capable of being copolymerised with (meth-)acrylic acid or (meth-)acrylic acid esters $Mt^{n\oplus}$ represents an n-valent metal cation where $n \geq 2$, $Mt^{\oplus}$ represents an alkali metal cation, e.g. $Na^{\oplus}$ or $K^{\oplus}$, or an ammonium cation;

u,v,x,y represents the molar proportions of the polymerised monomers in mol % contained in the copolymer, as follows:

u: 20–99 mol %, preferably 40–98 mol %;

X: 0.5–10 mol %, preferably 1–5 mol %; and v+y: 0–79.5 mol %, preferably 0–55 mol %.

The groups $R^1$ occurring repeatedly in the monomers in the above formula indicated by u,v,x, need not necessarily all have the same meaning but may differ from each other.

The group $R^2$ in the above formula is the residue of a monomeric cross-linking compound. In the context of this invention, this means polyfunctional monomeric compounds which have at least two, and occasionally three or more, double bonds capable of copolymerising with acrylic acid, methacrylic acid or (meth-)acrylic acid esters and which, by virtue of the repeated presence of copolymerisable double bonds, can be fixed in various copolymer chains, thereby effecting cross-linking of the copolymers.

Examples of suitable cross-linking compounds include divinyl cyclohexane, trivinyl cyclohexane, tetraallyloxyethane, divinyl benzene, 1,7-octadiene and other cross-linking compounds described in "Houben-Weyl, Methoden der Organischen Chemie, Makromolekulare Stoffe, part 1, Georg Thieme Verlag, Stuttgart, 1961, p. 32–33.

The copolymerisable, ethylenically unsaturated compounds represented by M in the general formula, which may be copolymerised with acrylic or methacrylic acid, include compounds which have a single unsaturated bond capable of polymerisation by addition, such as an ethylenic double bond. These compounds include acrylates; acrylamides; methacrylates; methacrylamides; allyl and vinylidene compounds; vinyl esters; vinyl ethers; crotonates; styrenes and (meth-)acrylonitrile. Examples of acrylates include alkyl acrylates such as methyl acrylate; ethyl acrylate; propyl acrylate; butyl acrylate; amyl acrylate; 2-ethylhexylacrylate; octyl acrylate; tert.-octyl acrylate; chloroethyl acrylate; 2,2-dimethyl-hydroxypropyl acrylate; 5-hydroxypentyl acrylate; trimethylolpropane monoacrylate; pentaerythritol monoacrylate; glycidyl acrylate; benzyl acrylate; methoxy-benzyl acrylate; furfuryl acrylate; tetrahydrofurfuryl acrylate, and aryl acrylates such as phenyl acrylate. Examples of methacrylates include alkyl methacrylates such as methyl methacrylate; ethyl methacrylate; propyl methacrylate; isopropyl methacrylate; butyl methacrylate; amyl methacrylate; hexyl methacrylate; octyl methacrylate; 4-hydroxybutyl methacrylate; 5-hydroxypentyl methacrylate; 2,2-dimethyl-3-hydroxypropyl methacrylate; trimethylol propane monomethylacrylate; pentaerythritol monomethacrylate; glycidyl methacrylate; cyclohexyl methacrylate; benzyl methacrylate; chlorobenzylmethacrylate; furfuryl methacrylate and tetrahydrofurfuryl methacrylate, as well as aryl methacrylates such as phenyl methacrylate; cresyl methacrylate and naphthyl methacrylate. Examples of acrylamides include acrylamide itself; N-monoalkyl and N,N-dialkyl acrylamides containing as their alkyl group or groups, for example, one or more methyl, ethyl, propyl, butyl, t-butyl, heptyl, octyl, cyclohexyl, benzyl or pentyl groups; specific examples including dimethylacrylamide, N,N-dibutylacrylamide and hydroxyethylacrylamide; also N-monoarylacrylamides containing e.g. a phenyl, tolyl or naphthyl group as their aryl group, and N-hydroxyaryl acrylamides such as hydroxyphenylacrylamide and mixed N-alkyl-N-aryl acrylamides, e.g. N-methyl-N-phenyl acrylamide. Examples of methacrylamides include methacrylamide itself and N-monoalkyl and N,N-dialkyl methacrylamides containing, for example, methyl, ethyl, t-butyl or 2-ethylhexyl groups as their one or two alkyl groups, e.g. methyl methacrylamide; hydroxyethyl methacrylamide; dimethylmethacrylamide; dibutyl methacrylamide and cyclohexyl methacrylamide; also N-aryl methacrylamides in which the aryl group may be, for example, a phenyl group; also N-hydroxyethyl-N-methyl-methacrylamide, N-methyl-N-phenyl methacrylamide and N-ethyl-N-phenyl methacrylamide. Examples of allyl compounds include allyl esters such as allyl acetate, allyl caproate, allyl caprylate, allyl acetoacetate, allyl laurate, allyl palmitate, allyl stearate, allyl benzoate, allyl lactate and allyl oxyethanol. Examples of vinyl ethers include alkyl vinyl ethers such as hexyl vinyl ether, octyl vinyl ether, decyl vinyl ether, 2-ethylhexyl-vinyl ether, methoxyethyl vinyl ether, ethoxyethyl-vinyl ether, chloroethylvinyl ether, 1-methyl-2,2-dimethylpropyl-vinyl ether, 2-ethyl butyl-vinyl ether, hydroxyethyl-vinyl ether, vinyl methyl ether, diethylene glycol-vinyl ether, dimethylaminoethyl-vinyl ether, butylaminoethyl-vinyl ether, diethylaminoethyl-vinyl ether, benzyl-vinyl ether and tetrahydrofurfuryl-vinyl ether; vinyl aryl ethers such as vinyl phenyl ether, vinyl tolyl ether, vinyl chlorophenyl ether, vinyl-2,4-dichlorophenyl ether, vinyl naphthyl ether and vinyl anthranyl ether. Examples of vinyl esters include vinyl acetate, vinyl butyrate, vinyl isobutyrate, vinyl trimethyl acetate, vinyl valerate, vinyl caproate, vinyl chloroacetate, vinyl dichloroacetate, vinyl methoxyacetate, vinyl butoxyacetate, vinyl phenylacetate, vinyl acetoacetate, vinyl lactate, vinyl propionate, vinyl-β-phenylbutyrate, vinyl benzoate, vinyl salicylate, vinyl chlorobenzoate, vinyl tetrachlorobenzoate and vinyl naphthoate. Examples of styrenes include styrene itself, alykl styrenes, e.g. p-methylstyrene, o-methylstyrene, 2,4-dimethylstyrene, trimethylstyrene, p-butylstyrene, p-hexylstyrene, α-methyl-styrene, decylstyrene, chloromethylstyrene, trifluoromethyl styrene, ethoxymethyl styrene and acetoxymethylstyrene; alkoxystyrenes such as p-methoxystyrene, 4-methoxy-3-methyl styrene and dimethoxystyrene; also halogen styrenes, e.g. p-chlorostyrene, tetrachlorostyrene, pentachlorostyrene, p-bromostyrene, 2,4-dibromostyrene, fluorostyrene, iodostyrene, trifluorostyrene, 2-bromo-4-trifluoromethylstyrene and 4-fluoro-3-trifluoromethylstyrene.

The polyvalent metal cations may be any positively charged metal cations or metal complex cations, provided that ion bonding or complex bonding takes place between the anionically built up polymer structure and the metal (complex) ion.

The polymer dispersions generally contain a small proportion of alkali metal cations which increase the stability of the dispersions. The proportions of alkali metal cations required to ensure the stability of the copolymer dispersion according to the invention, depends, to a large extent, on the nature of the polyvalent metal cation.

The copolymer dispersions according to the invention may contain wetting agents, although they are generally sufficiently stable without any additions, and are unaffected by the addition of water-miscible solvents so that the addition of wetting agents is in most cases unnecessary.

The copolymer dispersions according to the invention have an average particle size of less than 10 μm, preferably less than 1 μm. Dispersions having particle sizes in the range of from 0.05 to 0.5 μm are particularly stable.

Examples of anionic copolymers containing polyvalent metal cations according to the invention are shown below.

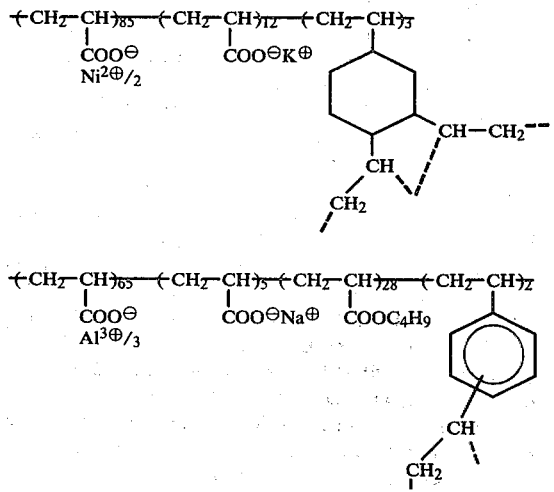

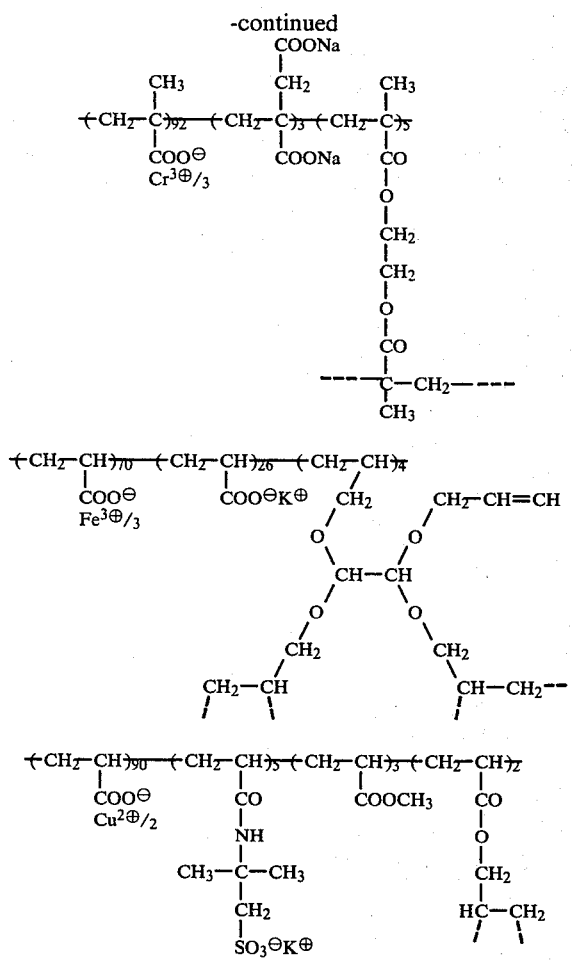

The copolymer dispersions according to the invention are advantageously prepared from the copolymer latices described in German Offenlegungsschrift No. 2,652,464. The cross linked dispersions present in the H⊕-form are neutralised with alkali and mixed with aqueous solutions of the required metal salts. Exchange reactions between the alkali metal ions and the non-alkali metal ions take place, as is known from the chemistry of ion exchangers. After removal of the ions not bound to the polymer latex by one of the usual methods such as dialysis, ultrafiltration or flocculation, washing and redispersion of the dispersion, the anionic copolymer dispersions containing polyvalent metal cations according to the invention are obtained.

In some cases, the copolymer dispersions described in German Offenlegungsschrift No. 2,652,464 which are present in their H⊕-form may be directly mixed with the corresponding metal hydroxide solutions, to form the anionic copolymer dispersions containing polyvalent metal cations according to the present invention, with the elimination of water.

Instead of from copolymer dispersions containing free acid groups, according to German Offenlegungsschrift No. 2,652,464, the copolymer dispersions according to the present invention may also be prepared from corresponding acrylate polymers by saponifying these with alkali to form alkali metal salt dispersions to which heavy metal salts are then immediately added, the excess salts formed being removed from the dispersions.

The copolymer dispersions according to the invention may be used in various ways to fix polyvalent metal cations in layers in a diffusion-fast form without loss of their reactivity with complex forming substances. The latices according to the invention may be mixed with binders such as gelatine, polyvinyl alcohol, cellulose derivatives or polyacrylamides and used in the form of this mixture to prepare transparent layers. If the layers have specified thickness, the foils obtained may be used for the qualitative and quantitative determination of substances which react with the bound polyvalent metal cations to form complexes having characteristic absorption bands in the UV or visible spectral range.

The copolymer dispersions according to the invention may also be used for introducing polyvalent metal cations in diffusion-fast form into the various layers of photographic materials. The layers may be either light-sensitive, e.g. silver halide emulsion layers, or light-insensitive layers of binders. Layers consisting of copolymer dispersions according to the invention with particles smaller than 0.4 μm and a binder such as gelatine, polyvinyl alcohol or cellulose derivatives, for example, are completely transparent and optically clear. The polyvalent metal cations are fixed by the copolymers contained in these layers, so that no diffusion of the metal ions present in the particles of dispersion takes place in the layer whether in the moist or dry state.

The synthetic copolymer dispersions containing polyvalent metal cations according to the invention may be mixed directly with the finished photographic gelatine silver halide emulsions. According to a preferred use of the copolymer dispersions according to the invention, the copolymer dispersion containing polyvalent metal cations according to the invention is added to a photographic silver halide emulsion and preparation of the emulsion is completed by the further addition of, for example, sensitizing dyes, anti-fogging agents, stabilizers, sensitivity regulators, coating auxiliaries and hardeners. The copolymer dispersions according to the invention are, of course, insensitive to the presence of polyvalent metal cations such as, for example, ions of cadmium, magnesium, zinc, rhodium, platinum and iridium, which are occasionally used in the form of salts to improve the photographic properties of silver halide emulsions. Typical examples of such salts include cadmium chloride, cadmium nitrate, magnesium chloride, zinc nitrate, zinc chloride and rhodium trichloride; see for example, German Offenlegungsschrift No. 2,841,875. It is therefore obvious to use the copolymer dispersions according to the invention as partial replacement for gelatine in photographic silver halide emulsions which contain such salts of polyvalent metals, to improve the mechanical properties of the layers.

By incorporating the anionic copolymers containing polyvalent metal cations according to the invention in light-insensitive layers of binders it is possible, for example, to prepare coloured filter layers or layers which are capable of being coloured, of the kind used as image receiving layers in photographic materials for the dye diffusion transfer process. When used for the preparation of coloured filter layers, the copolymer dispersions according to the invention may be coloured with a suitable complex forming dye and then cast as a layer after having been mixed with a binder such as gelatine.

According to a particularly preferred application of the anionic copolymer dispersions containing polyvalent metal cations according to the invention, image receiving layers for photographic materials used for the dye diffusion transfer process are prepared by casting the copolymer dispersions together with a suitable binder such as gelatine and, optionally, a mordant containing cationic groups for anionic dyes to form an image receiving layer.

Such image receiving layers constitute an important layer element in photographic materials for the dye diffusion transfer process. In its simplest form, such a photographic material consists of a support layer on which is arranged an image receiving layer containing a polymer dispersion corresponding to the general formula, optionally together with a colloidal binder. The support layer may be covered with a conventional bonding layer to improve the adherence of the image receiving layer. Such a material is suitable as image receiving material for any photographic dye diffusion transfer process in which diffusible image dyes or diffusible colour formers (image dye precursors) having substituents capable of chelate formation are used or released imagewise and can be transferred to an image receiving layer. After this transfer, such a photographic material has an imagewise distribution of one or more such dyes in the image receiving layer.

According to an advantageous embodiment of the invention, the photographic material may comprise at least one layer containing a dye carrying a, preferably acid, substituent which is suitable for chelate formation or a corresponding precursor compound as well as at least one light-sensitive layer, in particular a light-sensitive silver halide emulsion layer, in addition to the image receiving layer in which the copolymer dispersion containing polyvalent metal cations according to the invention is situated. The above mentioned dyes or dye precursor compounds containing chelate forming substituents will all be referred to as colour providing compounds hereinafter. The photographic material comprising the image receiving layer formed from the copolymer dispersions containing polyvalent metal cations according to the invention may advantageously also contain several light-sensitive silver halide emulsion layers differing in their spectral sensitivity as well as other, light-insensitive layers such as intermediate layers, covering layers and other layers with various functions of the kind commonly used in multi-layered colour photographic recording materials.

Photographic materials having an image receiving layer containing a copolymer dispersion according to the invention, i.e. image receiving materials and in particular colour photographic recording materials which contain such an image receiving material as an integral substituent, may in addition contain acid layers and so-called retarding layers which together form a so-called combined neutralisation system. Such a neutralisation system may be arranged in known manner between the support layer and the image receiving layer placed on it or it may be arranged in some other position in the combination of layers, e.g. in a position above the light-sensitive layers, i.e. on the far side of the light-sensitive layers when viewed from the image receiving layer. The neutralisation system is normally orientated so that the retarding layer is situated between the acid layer and the level at which the alkaline developer liquid or paste acts. Such acid layers, retarding layers or neutralisation layers composed of both the above layers have been disclosed, for example, in U.S. Pat. Nos. 2,584,030; 2,983,606; 3,362,819 and 3,362,821 and German Offenlegungsschriften Nos. 2,455,762; 2,601,653; 2,716,505 and 2,816,878. Such a neutralisation system may also contain two or more retarding layers in known manner.

According to a particular embodiment, the photographic material may also contain one or more pigment-containing opaque layers which are permeable to aqueous liquids. These layers may fulfil two functions. First, they may prevent undesirable access of light to light-sensitive layers, and secondly such a pigment layer may form an aesthetically pleasing background for the colour image produced, particularly if a light or white pigment suc as $TiO_2$ is used in the pigment layer. Integral colour photographic recording materials containing such a pigment layer are known, e.g. from U.S. Pat. No. 2,543,181 and German Auslegeschrift No. 1,924,430. Instead of using a preformed opaque layer, there may also be provided means for producing such a layer during the development process. Such pigment layers may be composed of two or more partial layers according to the two functions mentioned above, one of these layers containing, for example, a white pigment while the other may contain, for example, a dark, light absorbent pigment such as carbon black.

In a preferred embodiment of the invention, the photographic material is an integral colour photographic recording material for carrying out the dye diffusion transfer process and comprises, for example, the following layer elements:

(1) a transparent support layer;
(2) an image receiving layer;
(3) a light-impermeable layer (pigment layer);
(4) a light-sensitive element comprising at least one light-sensitive silver halide emulsion layer and at least one colour providing compound associated therewith;
(5) a retarding layer;
(6) an acid polymer layer;
(7) a transparent support layer;

This material may be arranged so that two different parts are prepared separately from each other, namely the light-sensitive part (layer elements 1 to 4), and the covering sheet (layer elements 5 to 7), and these two parts are then placed face to face with their layers in contact and joined together, optionally using spacer strips to form a space between the two parts for receiving an accurately measured quantity of a developer liquid. The layer elements 5 and 6 which together form the neutralisation system may also be arranged between the support layer and the image receiving layer of the light sensitive part, but in the reverse sequence.

Means may be provided to introduce a developer liquid between two adjacent layers of the integral recording material. Such means may consist, for example, of a container placed laterally which can be split open to release its contents between two adjacent layers of the recording material when subjected to mechanical forces. In the present case, the developer liquid is poured between the light sensitive part and the cover sheet.

In an integral recording material, the light-sensitive element is an essential constituent of a photographic visualised by the present invention. If the photographic material of the present invention is not itself light-sensitive but consists mainly of only a support layer and an image receiving layer containing the copolymers of the present invention, it is brought into contact, during the development process, with an imagewise exposed colour photographic recording material, consisting essentially of a supported light-sensitive element which contains at least one light-sensitive silver halide emulsion layer itself. In the latter case, it is preferable to choose an image dye of such a colour that the predominant absorption range of the colour providing compound does not coincide with the predominant sensitivity range of the silver halide emulsion layer. In order to obtain multicoloured transfer images in colours true to life, the light sensitive element contains three such associations of colour providing compound with light sensitive silver halide emulsion layer, and the absorption range of the image dye obtained from the colour providing compound generally substantially coincides with the range of spectral sensitivity of the associated silver halide emulsion layer. To obtain the highest possible sensitivity in such a case, however, it is advantageous to arrange the colour providing compound in a separate layer of binder situated behind, viewed in the direction of the incident light used for exposure, the silver halide emulsion layer or to use a colour providing compound having an absorption different from that of the image dye ("shifted image dyes"—U.S. Pat. No. 3,854,945). An absorption shift generally results from the complex formation which takes place in the image receiving layer by reaction with the copolymer dispersions containing polyvalent metal cations according to the invention if dyes which carry substituents capable of chelate formation are used. Colour providing compounds containing such dye residues have been described in, for example, U.S. Pat. No. 3,081,167 and German Offenlegungsschrift No. 2,740,719.

The developer oxidation products resulting from the development of a silver halide emulsion must not, of course, act on any other than the associated colour providing compound. Separating layers are therefore generally present in the light-sensitive element to prevent diffusion of the developer oxidation products into other layers which are not associated with them. These separating layers may, for example, contain suitable substances capable of reacting with the developer oxidation products. Non-diffusible hydroquinone derivatives, for example, may be used for this purpose, or also non-diffusible colour couplers if the developer compound used is a colour developer.

The colour providing compounds may be diffusible coloured compounds which begin to diffuse when the layers are treated with an alkaline processing liquid and are only fixed in the exposed areas by development. Alternatively, the colour providing compounds may be diffusion-fast and release a diffusible dye during development.

Colour providing compounds which are, a priori, diffusible have been disclosed, for example, in German Patent Nos. 1,036,640; 1,111,936 and 1,196,075. The so-called dye developers described there contain, in one and the same molecule, a dye residue and a group which is capable of developing exposed silver halide.

Among the known processes for the preparation of colour photographic images by the dye diffusion transfer process, those which are based on the use of colour providing compounds which are incorporated in a diffusion-fast form and from which diffusible dyes or dye precursors are split off imagewise during development and transferred to an image receiving layer have recently become increasingly important. Such non-diffusible colour providing compounds have been described, for example, in the following publications: U.S. Pat. Nos. 3,227,550; 3,443,939 and 3,443,940 and German Offenlegungsschriften Nos. 1,930,215; 2,242,762; 2,402,900; 2,406,664; 2,505,248; 2,543,902; 2,613,005; 2,645,656 and 2,809,716 and Belgian Patent No. 861,241.

In the above publications there are described both those non-diffusible colour providing compounds which produce negative colour images when conventional negative silver halide emulsions are used and those which produce positive colour images when negative silver halide emulsions are used. If positive colour images are to be obtained when the first type of compound is used it is necessary either to use direct positive silver halide emulsions or, if negative emulsions are used, to employ one of the known reversal processes, e.g. one based on the silver salt diffusion process (U.S. Pat. No. 2,763,800) or one which is based on the use of compounds which release development inhibitors as a result of the development process.

When the image receiving layers used contain copolymer dispersions charged with polyvalent metal cations according to the invention, it is preferred to use colour providing compounds in which the dye residue contains substituents capable of complex formation. These include in particular the azo dyes which have chelate forming substitutuents such as OH, NHR or ring nitrogen atoms adjacent to the azo bond. Colour providing compounds containing such dye residues have been described, for example, in Research Disclosure Publications No. 17334 (Sept. 1978) and No. 18022 (April 1979).

EXAMPLE 1

The preparation and possibilities of using the dispersion are explained in the following Example.

STARTING LATEX A

I. 23 g of a 45% aqueous solution of sodium dodecyldiphenyl ether disulphonate were added to 3400 g of deionised water under nitrogen. 200 g of a monomer mixture of 1245 g of methyl acrylate and 100 g of freshly distilled trivinyl cyclohexane were added at 75° C. with vigorous stirring. 88 g of a solution of 8.25 g of potassium peroxydisulphate in 260 g of water (initiator solution) were added after 10 minutes, and the remainder of the initiator solution was then added all at once at 80° to 83° C. A solution of 88 mg of tert.-butylhydroperoxide and 440 mg of sodium dodecyldiphenylether disulphonate in 4.5 g of distilled water and a solution of 800 mg of ascorbic acid in 87 g of distilled water were added to the mixture after 30 minutes and the mixture was stirred for a further 2 hours at 80° to 83° C. Small quantities of polymer which precipitated were filtered off.

II. 101 g of potassium hydroxide in 4000 g distilled water were added to 2560 g of the latex prepared according to I. and a further 223 g of potassium hydroxide in 875 ml of water were added after 7 hours' stirring. The mixture was then stirred at boiling temperature for a further 20 hours until it reached pH 10. The resulting latex contained the acrylate units in the form of the potassium salt.

The latex was dialysed and adjusted to a solids content of 14% by weight.

STARTING LATEX B

The procedure is the same as under A but using a mixture of 1200 g of methyl acrylate, 50 g of divinyl benzene and 100 g of butyl acrylate instead of the monomer mixture described under A.

STARTING LATEX C

The procedure is the same as under A but using a mixture of 1100 g of methyl acrylate, 75 g of trivinyl cyclohexane and 175 g of carboxyethyl acrylate instead of the monomer mixture described under A.

COMPARISON LATEX

Polymer X of Example 10 of German Offenlegungsschrift No. 2,841,875 was prepared as comparison substance to demonstrate the stability of the latices according to the invention.

MT-LATICES 1 TO 24 (LATICES CONTAINING METAL IONS)

500 g of one of the starting latices, A, B and C having a solids content of 14% by weight are stirred up with 250 ml of a metal salt solution within 30 minutes. The nature and quantity of the salt are shown in the following Table 1. The latex containing metal ions is subsequently dialysed for 48 hours.

TABLE 1

| Mt-Latex | Starting Latex | Metal Salt | Quantity in (g) | Stability/Coagulation after 7 days |
|---|---|---|---|---|
| 1 | Latex A | Aluminium nitrate.9$H_2O$ | 4.36 | no coagulate |
| 2 | A | Copper-II-chloride.2$H_2O$ | 10.4 | " |
| 3 | A | cobalt-II-nitrate.6$H_2O$ | 20 | " |
| 4 | A | lead nitrate | 19.3 | " |
| 5 | A | zinc chloride | 6.4 | " |
| 6 | A | iron-II-chloride.4$H_2O$ | 12.3 | " |
| 7 | A | iron-III-chloride.6$H_2O$ | 19.4 | " |
| 8 | A | copper-II-nitrate.3$H_2O$ | 5.5 | " |
| 9 | A | nickel sulphate.7$H_2O$ | 40 | " |
| 10 | A | cadmium nitrate.4$H_2O$ | 16.5 | " |
| 11 | A | magnesium chloride.6$H_2O$ | 18.2 | " |
| 12 | A | platinum-IV-chloride.5$H_2O$ | 15.4 | " |
| 13 | A | rhodium nitrate.2$H_2O$ | 7.9 | " |
| 14 | A | iridium tetrachloride | 9.4 | " |
| 15 | A | silver nitrate | 10.4 | " |
| 16 | A | gold-III-chloride | 15.3 | " |
| 17 | Latex B | chromium-III-chloride.6$H_2O$ | 16.3 | " |
| 18 | B | nickel sulphate.7$H_2O$ | 36.5 | " |
| 19 | B | zinc chloride | 5.2 | " |
| 20 | B | cobalt-II-nitrate.6$H_2O$ | 18.1 | " |
| 21 | Latex C | copper-II-chloride.2$H_2O$ | 11.1 | " |
| 22 | C | iron-II-chloride.4$H_2O$ | 13.1 | " |
| 23 | C | magnesium chloride.6$H_2O$ | 21.2 | " |
| 24 | C | gold-III-chloride | 10.7 | " |
| Comparison Latex OS 1 | 2,841,875 Polymer X | nickel sulphate.7$H_2O$ | 36.5 | completely coagulated |
| Comp. Latex 2 | X | chromium-III-chloride.6$H_2O$ | 16.3 | completely coagulated |

EXAMPLE 2

I 1 g of Mt-Latex 7 is added to 10 g of a 10% gelatine solution. The solution is poured out on glass plates and dried to form transparent films.

II 1.0 g of a 4% chromium-III-chloride solution is added to 10 g of a 10% gelatine solution. The solution obtained is poured out on glass plates and dried.

The films obtained under I. and II. are placed in boiling water.

Layer I dissolves:

Layer II swells slightly and is resistant to boiling water.

The experiment shows that the dispersions according to the invention contain the metal ions firmly bound. If the metal ions were only loosely bound to the latex, they would be expected to diffuse out of the latex into the gelatine of the layer, which would lead to cross-linking, as found in layer II.

EXAMPLE 3

The use of the copolymer dispersions containing polyvalent metal cations according to the invention in image receiving layers for the dye diffusion transfer process is described in this Example.

An image receiving material A was prepared by applying the following layers successively to a transparent support layer of polyethylene terephthalate (the quantities indicated are based on 1 $m^2$).

1. An image receiving layer of 2.7 g of Mt-latex 9 and 2.7 g of gelatine.
2. A white pigment layer of 24 g of $TiO_2$ and 2.4 g of gelatine.
3. A black pigment layer of 1.9 g of carbon black and 2.0 g of gelatine.

An image receiving material B was prepared for comparison. It differed from material A only in that, instead of containing Mt-Latex 9, it contained the same quantity of a copolymer of styrene, N-vinylbenzyl-N,N,N-trimethylammonium chloride and 1,4-divinylbenzene.

The two image receiving materials A and B were coloured with the dyes indicated below, which form coloured metal complexes with $Ni^{2\oplus}$ ions. To colour the receptor materials with the dyes, strips of the materials were immersed in aqueous solutions of the dyes (0.3 mmol/100 ml; pH 13) until the colouring appearing on the side of the transparent support attained a density of 1.3. In layer B which was free from $Ni^{2\oplus}$, the dyes appeared in their original colour whereas in layer A containing the copolymer dispersion according to the invention, a shift in colour toner occurred due to complex formation and the desired colour tone of the complexed dye was obtained. In comparison material B, this required an after-treatment with a 3% nickel acetate solution.

The results obtained with materials A and B and dyes 1, 2 and 3 are entered in the following Table 2.

TABLE 2

| Dye | max [nm] A | B | B/Ni-ac | Light fastness Residual density after $7.2 \cdot 10^6$ lux hours A | B | B/Ni-ac |
|---|---|---|---|---|---|---|
| 1 | 650 | 610 | 650 | 70% | 0% | 44% |
| 2 | 530/570 | 505 | 530/575 | 93.7% | 23% | 66% |
| 3 | 530 | 500 | 530/575 | 96% | 26% | 86% |

"Ni-ac" in columns 4 and 7 indicates: After-treated with nickel acetate

Dyestuff 1

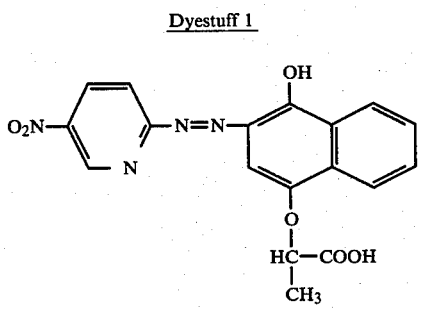

Dyestuff 2

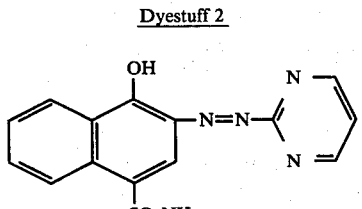

Dyestuff 3

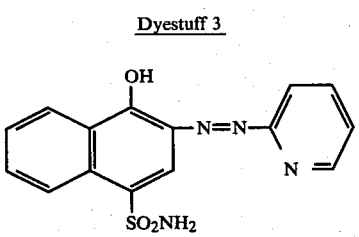

We claim:
1. A supported transparent layer consisting of a polymer dispersion of particles of a cross-linked anionic copolymer dispersed in a binder wherein said anionic copolymer has non-ionic cross-links, contains polyvalent metal ions and which corresponds to the following formula

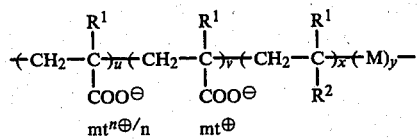

in which
$R^1$ represents hydrogen, methyl or carboxymethyl,
$R^2$ represents the residue of an organic cross-linking compound having in the monomeric state at least two copolymerizable C—C double bonds,
M represents polymerized units of an ethylenically unsaturated monomer capable of copolymerisation with acrylic acid, methacrylic acid or (meth-)acrylic acid esters
$mt^{n\oplus}$ represents a metal cation of valency n, where $n \geq 2$,
$mt^\oplus$ represents an alkali metal cation or an ammonium cation,
u,v,x,y represent the molar proportions in mol % of the polymerised monomers contained in the copolymer, as follows:
u: 20–99 mol %,
x: 0.5–10 mol %
the molar proportions represented by v and y may combine to equal a mol percent of from 0 to 79.5.

2. A photographic material comprising an image receptor layer for dye diffusion transfer process and coated with an anionic copolymer containing polyvalent metal cations which is capable of being colored or has been colored with acid dyes which have been diffused in the dye diffusion process, in which that layer which has been
colored or is capable of being colored contains a polymer dispersion consisting of dispersed particles of cross-linked anionic copolymer containing polyvalent metal ions corresponding to the following formula

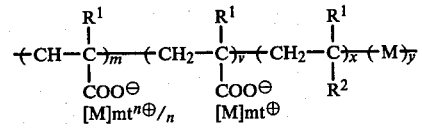

in which
$R^1$ represents hydrogen, methyl or carboxymethyl
$R^2$ represents the residue of an organic cross-linking compound having in the monomeric state at least two copolymerizable C—C double bonds,
M represents polymerized units of an ethylenically unsaturated monomer capable of being copolymerized with acrylic acid, methacrylic acid or (meth-)acrylic acid esters
$mt^{n\oplus}$ represents a metal cation of valency n, where $n \geq 2$,
$mt^\oplus$ represents an alkali metal cation or an ammonium cation, and
u,v,x,y, represent the molar proportions in mol % of the polymerized monomers contained in the copolymer, namely as follows:
u: 20–99 mol %
x: 0.5–10 mol %,
the molar proportions represented by v and y may combine to equal a molar percent of from 0 to 79.5.

3. An image receptor layer in a photographic material for dye diffusion transfer process
coated with an anionic copolymer containing polyvalent metal ions in an effective amount to form a metal-dye complex with dyes which have diffused in the dye diffusion process
which polymers correspond to the following formula:

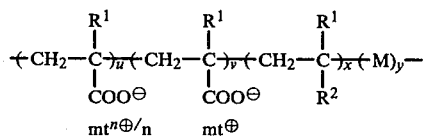

in which
$R^1$ represents hydrogen, methyl or carboxymethyl,
$R^2$ represents the residue of an organic cross-linking compound having in the monomeric state at least two copolymerizable C—C double bond,
M represents polymerized units of an ethylenically unsaturated monomer capable of copolymerisation with acrylic acid, methacrylic acid or (meth-)acrylic acid esters
$mt^{n\oplus}$ represents a metal cation of valency n, where $n \geq 2$,
$mt^\oplus$ represents an alkali metal cation or an ammonium cation,
u,v,x,y represent the molar proportions in mol % of the polymerised monomers contained in the copolymer, as follows:
u: 29–99 mol %,
x: 0.5–10 mol %
the molar proportions represented by v and y may combined to equal a mol percent of from 0 to 79.5.

* * * * *